(No Model.)
S. J. SPURGEON.
REIN PROTECTOR.
No. 291,797. Patented Jan. 8, 1884.
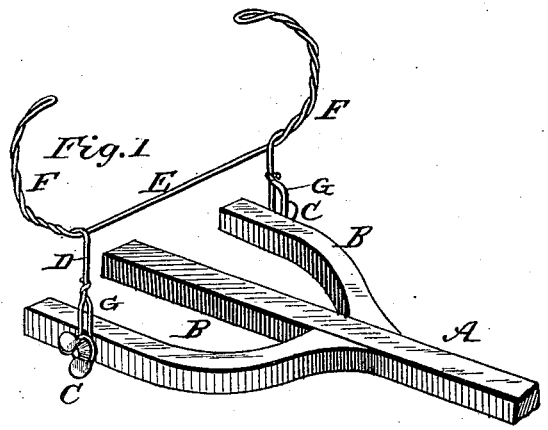
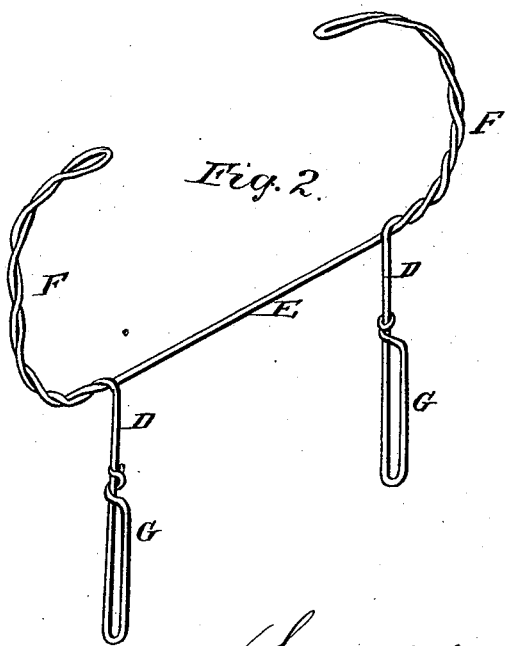
WITNESSES:
Fred. G. Dieterich
Wm. Lecher
Samuel J. Spurgeon
INVENTOR.
By Louis Bagger & Co.
ATTORNEYS.

UNITED STATES PATENT OFFICE.

SAMUEL J. SPURGEON, OF HOUSTONIA, MISSOURI.

REIN-PROTECTOR.

SPECIFICATION forming part of Letters Patent No. 291,797, dated January 8, 1884.

Application filed August 4, 1883. (No model.)

*To all whom it may concern:*

Be it known that I, SAMUEL J. SPURGEON, of Houstonia, in the county of Pettis and State of Missouri, have invented certain new and useful Improvements in Adjustable Rein-Protectors; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the tongue of a cultivator or similar agricultural implement provided with my improved rein-protector, and Fig. 2 is a similar view of the supporter or protector detached.

Similar letters of reference indicate corresponding parts in both the figures.

My invention has relation to rein supporters or protectors; and it consists in the improved construction of such a device, especially adapted to be attached to a cultivator, composed of one rod of metal, as hereinafter more fully described and claimed.

In the accompanying drawings, the letter A indicates the tongue of a cultivator or other similar agricultural implement, the rear end of which forms hounds B B, in the sides of which turn two laterally-projecting set-screws, C, upon which the supporter is fastened.

The supporter or protector consists of a metal rod, D, the middle portion, E, of which is straight, or nearly so, and forms the place upon which the reins rest, and the portions F, on both sides of the central portion, are doubled, twisted a few times, and curved slightly inward, so as to prevent the reins resting upon the central portion from slipping off the same, or from being easily raised up from the same out of the fork formed by those portions of the rod. The free ends of the rod are bent downward and doubled upward again, twisted around the upper portion, forming long slots G, in which the set-screws slide, bearing, when screwed home, against the outer sides of the slots with their heads, so that the protector may be raised or lowered, as desired. In this manner the protector or supporter may be manufactured with comparative ease and at a small cost, and will prevent the reins from becoming tangled up or caught in the parts of the cultivator, thus making it easier and more convenient to guide the team, insuring thereby better work.

It follows that by slightly changing the proportions of the several parts of the protector it may be adapted to be fastened upon implements of different shape, and to be fastened upon implements having a tongue bifurcated to form hounds, as in the tongue shown in the drawings, or single, and that by twisting the sides of the slots formed by the lower ends it may be fastened upon surfaces at different angles to the direction of the central portion.

If desired, the supporter may be constructed of two uprights having a roller journaled between them, upon which the reins rest.

I am aware that rein-supporters have been made of one or more metallic rods, bent to form a rest for the reins, and upwardly and inwardly curved abutments at the sides, and adapted to be secured upon the dash-board of a vehicle, and I do not wish to claim such construction; but

What I claim, and desire to secure by Letters Patent of the United States, is—

The combination of a cultivator-tongue, set screws or bolts turning in the sides of the same, and a rein-supporter consisting of one piece of metal rod having its ends doubled and twisted around the straight upright portions, forming slots for the reception of the securing-screws, having its central portion straight and horizontal, and having the ends of the said straight portion and of the upright portions doubled, twisted, and curved upward and inward, as and for the purpose shown and set forth.

In testimony that I claim the foregoing as my own I have hereunto affixed my signature in presence of two witnesses.

SAMUEL J. SPURGEON.

Witnesses:
W. J. WEBB,
W. H. REAVIS.